US011118057B1

(12) United States Patent
Ding et al.

(10) Patent No.: US 11,118,057 B1
(45) Date of Patent: Sep. 14, 2021

(54) ATTENUATION MATERIAL COMPOSITION, ATTENUATION MATERIAL AND PREPARATION METHOD AND USE THEREOF

(71) Applicant: China University of Petroleum (Beijing), Beijing (CN)

(72) Inventors: Pinbo Ding, Beijing (CN); Shiqi Huang, Beijing (CN); Jianxin Wei, Beijing (CN); Bangrang Di, Beijing (CN); Feng Zhang, Beijing (CN); Lianbo Zeng, Beijing (CN); Xiangyang Li, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 0 days.

(21) Appl. No.: 17/217,086

(22) Filed: Mar. 30, 2021

(30) Foreign Application Priority Data

Apr. 9, 2020 (CN) .......................... 202010275601.9

(51) Int. Cl.
*C08L 83/04* (2006.01)
*C08L 63/00* (2006.01)
*G09B 23/40* (2006.01)

(52) U.S. Cl.
CPC ............... *C08L 83/04* (2013.01); *C08L 63/00* (2013.01); *G09B 23/40* (2013.01)

(58) Field of Classification Search
CPC ......... C08L 83/00–16; C08L 63/00–10; G09B 23/06–10; G09B 23/40; G01V 1/00–523
See application file for complete search history.

(56) References Cited

FOREIGN PATENT DOCUMENTS

| CN | 1772809 A | 5/2006 |
|---|---|---|
| CN | 102443245 A | 5/2012 |

*Primary Examiner* — Kregg T Brooks
(74) *Attorney, Agent, or Firm* — Volpe Koenig

(57) ABSTRACT

The attenuation material composition disclosed in the present disclosure comprises a room temperature vulcanized silicone rubber, an epoxy resin, a first curing agent and a second curing agent, wherein the first curing agent comprises ethyl orthosilicate and dibutyltin oxide; and the weight ratio of the room temperature vulcanized silicone rubber to the epoxy resin is (0.1-1):1.

19 Claims, 3 Drawing Sheets

ATTENUATION MATERIAL COMPOSITION, ATTENUATION MATERIAL AND PREPARATION METHOD AND USE THEREOF

CROSS REFERENCE TO RELATED APPLICATIONS

The application claims priority to Chinese Application No. 202010275601.9, filed on Apr. 9, 2020, entitled "Attenuation material composition, attenuation material and preparation method and use thereof", which is herein specifically and entirely incorporated by reference.

FIELD

The present disclosure relates to the technical field of oil & gas exploration and development, and in particular to an attenuation material composition, an attenuation material and a preparation method and an use thereof.

BACKGROUND

Physical modeling is an important technological tool in the technical field of petroleum physical exploration, it makes significant guidance for the exploration and development of oil and gas by using seismic physical models and indoor ultrasonic wave acquisition systems for performing laboratory collection, processing and further investigating the seismic response characteristics of particular models. In the researches of seismic physical modeling, the preparation of physical model materials is a key technology for producing physical models, the simulation accuracy is directly associated with the success of failure of the simulation experiment analysis, thus it has important research value and significance for simulation of particular oil and natural gas reservoirs.

The surface stratum and near surface stratum typically exhibit the characteristics of high attenuation and low velocity. The absorption and attenuation effect of the stratum in regard to the seismic energy typically causes loss of probe signal energy, which affects the resolution of the data, and reduces the precision of underground oil and gas detection.

The characteristics of stratum attenuation are researched in the laboratory by using the physical model simulation method, and the reflected wave data based on the physical model can effectively simulate the field exploration situation, the various parameters of the simulation process have high controllability, and the obtained seismic data has a relatively high Signal Noise Ratio (SNR), thereby facilitating the data analysis and the verification of theoretical methods, assumptions or hypotheses.

The exiting epoxy resin materials may be used for preparing the composite materials by means of an epoxy resin and silicone rubber, have a velocity within a range of 2,000-2,600 m/s and a quality factor Q value within a range of 40-60, which is significantly different from the quality factor Q value 15-40 of the near-surface stratum in practice.

Therefore, it has a great significance to develop a high attenuation material so as to prepare seismic physical model for simulating a near-surface stratum.

SUMMARY

The present disclosure aims to overcome the problem in the prior art that quality factor Q value of the attenuation materials is high, and provides an attenuation material composition and an attenuation material, and a preparation method and an use thereof, the attenuation material prepared in the present disclosure has an approximately exponential relationship between the Q value and the velocity, which is close to the actual stratum characteristics, thus the attenuation material can be used in the seismic physical simulation.

In order to achieve the above object, a first aspect of the present disclosure provides an attenuation material composition comprising a room temperature vulcanized silicone rubber, an epoxy resin, a first curing agent and a second curing agent, wherein the first curing agent comprises ethyl orthosilicate and dibutyltin oxide; and the weight ratio of the room temperature vulcanized silicone rubber to the epoxy resin is (0.1-1):1.

A second aspect of the present disclosure provides a method for preparing an attenuation material with the aforementioned attenuation material composition, including:

(1) subjecting a room temperature vulcanized silicone rubber to a first heat treatment and then subjecting to a first mixing with a first curing agent to obtain a modified silicone rubber;

(2) subjecting an epoxy resin to a second heat treatment and then subjecting to a second mixing with a second curing agent and the modified silicone rubber;

(3) injecting the mixture obtained in step (2) into a mould and performing a curing process.

In a third aspect, the present disclosure provides an attenuation material prepared with the aforementioned method.

In a fourth aspect, the present disclosure provides a method for using the aforementioned attenuation material in the seismic physics models.

Due to the aforementioned technical scheme, the present disclosure uses a process of mixing a room temperature vulcanized silicone rubber, an epoxy resin, a first curing agent and a second curing agent, in particular, the room temperature vulcanized silicone rubber, wherein the thiol group of the room temperature vulcanized silicone rubber may perform chemical reaction with the epoxy resin and gradually harden and shape up; the mixture can be conveniently processed in the present disclosure into various forms through a mould, thereby producing the attenuation materials suitable for seismic physical models, the plasticity is strong; in addition, the longitudinal velocity, lateral velocity, density and quality factor Q value of the attenuation materials can meet the requirements of the near surface stratum simulation; moreover, the method of the present disclosure has a simple process and desirable stability.

Figure 1:
FIG. 1 illustrates a schematic flow diagram of a method of preparing an attenuation material of the present disclosure.

DESCRIPTION OF REFERENCE SIGNS 1. a photograph of a sample of the attenuation material prepared in Example 7;
2. a photograph of a sample of the attenuation material prepared in Comparative Example 2.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides an attenuation material composition, wherein the attenuation material composition comprising a room temperature vulcanized silicone rubber, an epoxy resin, a first curing agent and a second curing agent, wherein the first curing agent comprises ethyl orthosilicate and dibutyltin oxide; and the weight ratio of the room temperature vulcanized silicone rubber to the epoxy resin is (0.1-1):1.

According to the present disclosure, the weight ratio of ethyl orthosilicate to dibutyltin oxide is 100:(2-4), preferably 100:(2.5-3.5). In the present disclosure, the weight ratio of ethyl orthosilicate to dibutyltin oxide is limited within the aforementioned range, such that the catalytic effect is desirable, and the prepared modified silicone rubber has stable properties.

According to the present disclosure, the weight ratio of the room temperature vulcanized silicone rubber to the first curing agent is 100:(2-4), preferably 100:(2.5-3.5), more preferably 100:3. In the present disclosure, the weight ratio of the room temperature vulcanized silicone rubber to the first curing agent is limited within the aforementioned range, such that the catalytic effect is desirable, and the prepared modified silicone rubber has stable properties.

According to the present disclosure, the room temperature vulcanized silicone rubber is 10-100 parts by weight, the first curing agent is 0.3-3 parts by weight, and the second curing agent is 10-30 parts by weight, based on 100 parts by weight of the epoxy resin; preferably, the room temperature vulcanized silicone rubber is 45-55 parts by weight, the first curing agent is 1-2 parts by weight, and the second curing agent is 15-25 parts by weight, based on 100 parts by weight of the epoxy resin. In the present disclosure, the contents of the room temperature vulcanized silicone rubber, the first curing agent and the second curing agent are limited within the aforementioned ranges, thus the catalytic effect is desirable, and the prepared modified silicone rubber has stable properties.

According to the present disclosure, the second curing agent is an aliphatic amine curing agent; the aliphatic amine curing agent preferably has a viscosity within a range of 50-120 mPa·s, more preferably 70-90 mPa·s at a temperature of 25° C., and an amine value of 600-700 mgKOH/g. In the present disclosure, the aliphatic amine curing agent is commercially available, for example, from Shanghai Resin Factory Co., Ltd., with the model number 593-2, a package size of 5 kg/20 kg, an appearance of colorless clear liquid, a chromaticity ≤2, a viscosity within a range of 70-90 mPa·s at a temperature of 25° C., and an amine value within a range of 600-700 mgKOH/g.

According to the present disclosure, the room temperature vulcanized silicone rubber has a viscosity within a range of 2,000-12,000 mPa·s, preferably 6,000 to 9,000 mPa·s, at a temperature of 25° C., and in the present disclosure, the room temperature vulcanized silicone rubber is commercially available, for example, from the Shanghai Resin Factory Co., Ltd., with the model number 107, a package size of 4 kg/50 kg, an appearance of colorless, clear and mobile liquid, a viscosity within a range of 6,000-9,000 mPa·s at a temperature of 25° C., and surface vulcanization time ≤2 h.

According to the present disclosure, the epoxy resin has a viscosity within a range of 9,000-14,000 mPa·s at a temperature of 25° C. and an epoxy value within a range of 0.5-0.54 mol/100 g; in the present disclosure, the epoxy resin is commercially available, for example, bisphenol A epoxy resin with the model number 618 purchased from the Shanghai Resin Factory Co., Ltd. with a package size of 20 kg, an appearance of colorless clear liquid, a chromaticity ≤2, a viscosity within a range of 11,000-12,000 mPa·s at a temperature of 25° C., and an epoxy value of 0.5-0.54 mol/100 g.

A second aspect of the present disclosure provides a method for preparing an attenuation material with the aforementioned attenuation material composition, including:

(1) subjecting a room temperature vulcanized silicone rubber to a first heat treatment and then subjecting to a first mixing with a first curing agent to obtain a modified silicone rubber;

(2) subjecting an epoxy resin to a second heat treatment and then subjecting to a second mixing with a second curing agent and the modified silicone rubber;

(3) injecting the mixture obtained in step (2) into a mould and performing a curing process.

According to the present disclosure, the first heat treatment in step (1) is performed by means of constant temperature heating, and the heating is kept at a temperature of 20-50° C. for 1-48 hours; preferably the heating is kept at a temperature of 32-40° C. for 24-25 hours.

According to the present disclosure, the conditions of the first mixing comprise: the stirring velocity is within a range of 70-95 rpm, and the stirring time is within a range of 6-12 min; more preferably, the stirring velocity is within a range of 80-90 rpm, and the stirring time is within a range of 8-10 min.

According to the present disclosure, the second heat treatment in step (2) is performed by means of constant temperature heating, and the heating is kept at a temperature of 20-50° C. for 1-48 hours; preferably, the heating is kept at a temperature of 32-40° C. for 24-25 hours.

According to the present disclosure, the conditions of the second mixing in step (2) comprise: the stirring velocity is within a range of 70-95 rpm, and the stirring time is within a range of 6-12 min; more preferably, the stirring velocity is within a range of 80-90 rpm, and the stirring time is within a range of 8-10 min.

According to the present disclosure, the curing process in step (3) may be carried out at room temperature, and in the present disclosure, the conditions of the curing specifically include a temperature within a range of 18-32° C. and the time within a range of 24-96 hours; preferably, a temperature within a range of 20-30° C. and the time within a range of 48-72 hours.

According to the present disclosure, the method further comprises: subjecting the mixture obtained after the second mixed to a third mixing under the vacuum condition; preferably, the conditions of the third comprise: the stirring velocity is within a range of 70-95 rpm, and the stirring time is within a range of 6-12 min; more preferably, the stirring velocity is within a range of 80-90 rpm, and the stirring time is within a range of 8-10 min.

According to the present disclosure, the method further comprises subjecting the prepared attenuation material to a surface finishing, in particular, taking out the sample from a mould and subjecting the sample with a processing with an engraving and milling machine, ensuring a smooth and flat surface with a finish degree of 0.01-0.02 mm and a parallelism of 0.01-0.02 mm; preferably a finish degree of 0.01 mm and a parallelism of 0.01 mm.

The mould is not particularly limited in the present disclosure, it may form a rectangular parallelepiped sample or a square cube sample. For example, the mould in the present disclosure may form a rectangular parallelepiped sample having a side length of 63-70 mm and a height of 55-70 mm, or a square cube sample having a side length of 63-70 mm or 55-70 mm.

In a third aspect, the present disclosure provides an attenuation material prepared with the aforementioned method.

The attenuation material has a longitudinal wave velocity Vp of 2.098-2.602 km/s, a transverse wave velocity Vs of 0.65-1.17 km/s, a density of 1.182-1.231 g/cm$^3$, Qp of 8.42-25.1 and Qs of 7.79-27.66. In addition, the preparation process is simple, and the attenuation material prepared in the present disclosure has an approximately exponential relationship between the Q value and the velocity, which is close to the actual stratum characteristics.

In a fourth aspect, the present disclosure provides a method for using the aforementioned attenuation material in seismic physical models.

The present disclosure will be described in detail with reference to example.

In the following examples and comparative examples:

1. Instruments (1) The heating and preheating device was an electro-heating standing-temperature cultivator, purchased from Tianjin Zhonghuan Experimental Electric Furnace Co., Ltd. with a model number DHP-600 and a temperature range of 35-40° C.

(2) The material weighing device was an electronic scale, purchased from the Chengdu Pris Electronic CO., LTD. with a model number JS-15S and a precision of 0.5 g.

(3) An electronic balance was commercially available from the Shanghai Shunyuhengping Scientific Instrument Co., Ltd. with a model number FA2004 and a precision of 0.1 mg.

(4) The ultrasonic testing apparatus was an ultrasonic transducer, purchased from the Guangzhou Shantou Ultrasonic Electronic Incorporated Company, with the model numbers RS1.0M20D, RP1.0M20D.

(5) A pulse initiator was commercially available from the Guangzhou Shantou Ultrasonic Electronic Incorporated Company, with a model number CTS-8077PR.

(6) The digital oscilloscope was purchased from Tektronix Technologies Co., Ltd. with a model number DP03012.

2. Measurement Method of the Quality Factor Q

The pulse transmission method was one of the most commonly used methods for measuring Q value in a laboratory, the method was mainly related to performing Q value measurement of a sample by using a transmitted wave excited by a transducer, the measurement process was generally consisting of a direct contact of the transducer with the sample by applying a corresponding coupling agent on the sample surface and coupling the sample to the transducer. When Q value measurement was performed by using the pulse transmission method, two different test modes can be selected according to the characteristics of the sample to be measured. A sample with known Q value was selected as a reference sample, the geometry of the reference sample shall be similar or identical with that of the sample to be measured, and the Q value of the sample to be measured was obtained by performing treatment by using a measurement data of the sample to be measured and the measurement data of the reference sample, the method was known as a reference sample method (spectral ratio method).

When the signal traveled the same distance x in two samples, the amplitude spectra of the received signals for two samples can be represented separately by:

$$A_1(x,f)=A_0(x_0,f)e^{-\alpha 1(f)x}G_1(f,r,v_1,x)w(f) \quad (1)$$

$$A_2(x,f)=A_0(x_0,f)e^{-\alpha 1(f)x}G_2(f,r,v_2,x)w(f) \quad (2)$$

wherein $A_1$, $A_2$ represented amplitude spectra of the received signals for the reference sample and the samples to be measured, respectively, wherein $A_0$ was a centrum spectrum, a was an attenuation coefficient, G was a diffraction effect factor (geometric diffusion factor), and w was a reception-response function of the instrument. The natural logarithm of the multiplier obtained by dividing the formula (1) by the formula (2) may generate a formula (3) as follows:

$$\ln\left(\frac{A_1}{A_2}\right) = z(\alpha_2 - \alpha_1) + \ln\left(\frac{G_1}{G_2}\right) \quad (3)$$

The material with lower attenuation was generally selected as a reference sample, e.g. an aluminium sample, such that the parameter $\alpha_1$ can be approximately regarded as 0. For the case of the constant Q model, the attenuation coefficient $\alpha$ had the following relationship with the quality factor Q:

$$Q \approx \frac{\pi f}{\alpha v} \quad (4)$$

Therefore, in order to obtain the quality factor Q of the samples, it was required to prepare a reference sample with similar shape (aluminum was used in the example, Q was approximately 15,000), and the speed, length of the samples and the waveform after the ultrasound passed through the transducer shall be known.

Example 1

The present example was aimed to illustrate an attenuation material prepared with the method of the present disclosure.

As shown in a schematic flow diagram of FIG. 1:

(1) A room temperature vulcanized silicone rubber (manufactured by the Shanghai Resin Factory Co., Ltd., with a model No. 107) was subjected to a first heat treatment by keeping heat at a temperature of 40° C. for 24 h, the room temperature vulcanized silicone rubber after the first heat treatment was then subjected a first mixing with ethyl orthosilicate and dibutyltin oxide under the condition consisting of a stirring velocity of 80 rpm for 8 min, so as to obtain a modified silicone rubber; wherein a ratio of ethyl orthosilicate to dibutyltin oxide was 100:3;

(2) the bisphenol-A epoxy resin with a model number 618 was subjected to a second heat treatment by keeping heat at a temperature of 40° C. for 24 h, the epoxy resin after the second heat treatment was subsequently subjected to a second mixing with the aliphatic amine curing agent (manufactured by the Shanghai Resin Factory Co., Ltd., with a model No. 593-2) and the modified silicone rubber under the condition consisting of a stirring velocity of 80 rpm for 10 min; the aforementioned mixture was put into a vacuum stirrer and subjected to continuous stirring and vacuumizing, the time was set at 6 min;

(3) the mixture of step (2) was injected into a mould and subjected to a curing treatment in a constant temperature oven at a temperature of 25° C. for 24 h;

In addition, the dosages of the components and the stirring conditions were as indicated in Table 1; and the performance parameters of the prepared attenuation materials were as shown in Table 2.

Examples 2-15

The attenuation materials were prepared according to the same method as Example 1 except that the dosages of the components and the stirring conditions were different, as specifically indicated in Table 1, and the performance parameters of the prepared attenuation materials were as shown in Table 2.

Comparative Examples 1-5

The attenuation materials were prepared according to the same method as Example 1 except that the dosages of the components and the stirring conditions were different, as specifically indicated in Table 1, and the performance parameters of the prepared attenuation materials were as shown in Table 2.

Note: "—" denotes the same conditions as those of the Example 1. "Temperature" refers to the temperatures of the first heating treatment in step (1) and the second heating treatment in step (2), that is, the temperatures of the first heating treatment and the second heating treatment are the same;

"stirring rate" also refers to the stirring rate of the first mixing in step (1) and the stirring rate of the second mixing in step (2), that is, the stirring rate of the first mixing and the stirring rate of the second mixing in step (2) are the same; The stirring speed of the two mixtures is the same;

"stirring time" refers to the time for putting the above mixture into the vacuum stirrer in step (2) to continue stirring, vacuumizing and setting time.

TABLE 2

| Examples | Sample height (mm) | Density (g/cm$^3$) | Velocity Vp (km/s) | Velocity Vs (km/s) | Qp | Qs |
|---|---|---|---|---|---|---|
| 2 | 54.79 | 1.199 | 2.56 | 1.127 | 20.35 | 19.9 |
| 3 | 55.02 | 1.203 | 2.565 | 1.107 | 16.89 | 15.67 |
| 4 | 54.73 | 1.204 | 2.533 | 1.074 | 14.72 | 14.32 |
| 5 | 54.75 | 1.214 | 2.449 | 1.015 | 13.57 | 12.87 |
| 6 | 54.69 | 1.213 | 2.481 | 1.014 | 12.99 | 11.51 |
| 7 | 54.82 | 1.216 | 2.417 | 0.963 | 11.19 | 10.75 |
| 8 | 55.68 | 1.216 | 2.399 | 0.946 | 11.44 | 10.23 |
| 9 | 54.8 | 1.22 | 2.303 | 0.862 | 10.64 | 10.17 |
| 10 | 55.63 | 1.217 | 2.353 | 0.897 | 10.94 | 9.8 |
| 11 | 55.13 | 1.222 | 2.301 | 0.844 | 10.39 | 9.5 |
| 12 | 55.42 | 1.224 | 2.278 | 0.791 | 9.51 | 9.43 |
| 13 | 54.85 | 1.226 | 2.201 | 0.712 | 9.02 | 9.07 |
| 14 | 55 | 1.226 | 2.203 | 0.703 | 8.81 | 8.11 |
| 15 | 54.85 | 1.231 | 2.098 | 0.65 | 8.42 | 7.79 |
| D1 | 54.98 | 1.171 | 2.608 | 1.183 | 34.56 | 40.89 |
| D2 | 72.78 | 1.021 | 1.890 | 0.542 | 4.33 | 3.98 |
| D3 | 55.62 | 1.199 | 2.633 | 1.16 | 32.33 | 24.92 |
| D4 | 53.28 | 1.182 | 2.599 | 1.16 | 27.78 | 22.37 |
| D5 | 52.66 | 1.202 | 2.533 | 1.17 | 13.33 | 4.77 |

Note:
Qp and Qs represent attenuation condition of the longitudinal wave and the transverse wave in the materials, respectively.

Wherein the velocity of the longitudinal waves is denoted as Vp, and the velocity of the transverse wave is denoted as Vs.

TABLE 1

| Items | Epoxy resin (g) | Room temperature vulcanized silicone rubber (g) | Second curing agent (g) | First curing agent (g) | Ratio of ethyl orthosilicate to dibutyltin oxide | Temperature (° C.) | Stirring velocity (rpm) | Stirring time (min) |
|---|---|---|---|---|---|---|---|---|
| 1 | 200 | 20 | 40 | 0.6 | 100:2 | 25 | 90 | 10 |
| 2 | 200 | 40 | 40 | 1.2 | 100:4 | 30 | 80 | 8 |
| 3 | 200 | 60 | 40 | 1.8 | 100:3.7 | 31 | 80 | 10 |
| 4 | 200 | 70 | 40 | 2.1 | 100:2.3 | 32 | 70 | 6 |
| 5 | 200 | 80 | 40 | 2.4 | 100:2.2 | 32 | 90 | 8 |
| 6 | 200 | 90 | 40 | 2.7 | 100:3.6 | 33 | 85 | 9 |
| 7 | 200 | 97 | 40 | 3 | 100:3 | 40 | 80 | 9 |
| 8 | 200 | 110 | 40 | 3.3 | 100:2.5 | 42 | 80 | 8 |
| 9 | 200 | 120 | 40 | 3.6 | 100:3.5 | 40 | 82 | 8 |
| 10 | 200 | 130 | 40 | 3.9 | 100:2.6 | 40 | 80 | 10 |
| 11 | 200 | 140 | 40 | 4.2 | 100:3.1 | 38 | 85 | 9 |
| 12 | 200 | 150 | 40 | 4.5 | 100:3.2 | 39 | 80 | 10 |
| 13 | 200 | 160 | 40 | 4.8 | 100:3.1 | 41 | 90 | 8 |
| 14 | 200 | 180 | 40 | 5.4 | 100:2.8 | 40 | 87 | 8 |
| 15 | 200 | 200 | 40 | 6 | 100:3 | 40 | 83 | 10 |
| D1 | 200 | 0 | 40 | 0 | — | — | — | — |
| D2 | — | — | — | — | — | 60 | — | — |
| D3 | — | — | — | — | — | — | 50 | 4 |
| D4 | — | — | — | — | — | — | 60 | 6 |
| D5 | — | — | — | — | — | 20 | — | — |

The Q value parameters of the attenuation materials (seismic physical models) prepared by the Examples 1-15 obtained by using the spectral ratio method are as shown in Table 2, the results of the Table 2 demonstrate that the attenuation materials prepared with the method of the present disclosure have a longitudinal wave velocity Vp within a range of 2.098-2.602 km/s, a transverse wave velocity Vs within a range of 0.65-1.17 km/s, a density of 1.182-1.231 g/cm$^3$, a Qp of 8.42-25.1, and a Qs of 7.79-27.66. However, the attenuation materials prepared in Comparative Example 1, Comparative Example 3, and Comparative Example 4 have larger values of Qp and Qs, the attenuation materials prepared in Comparative Example 2 and Comparative Example 5 have lower values of Qp and Qs, such that the attenuation of the attenuation materials are excessive. It demonstrates that only the attenuation materials having parameters within the ranges of longitudinal velocity, transverse velocity, density, and quality factor Q value of the attenuation materials prepared in Examples 1-15 of the present disclosure may favorably meet the requirements of the near-surface stratum simulation.

In addition, the pulse transmission interpolation method is selected during a process of measuring the attenuation parameters of the model samples (attenuation materials), the pulse transmission interpolation method has higher stability and accuracy, and can adjust the distance between the transducers so as to minimize the influence of diffraction effect on the measurement of the Q value, the measurement principle of the method has been described in detail in the preceding text. Wherein the measurement transducers have a dominant frequency of 1 MHz, the distance between the measuring transducers is set at 195 mm, and the attenuation material is disposed between the two transducers and close to the middle position, so as to reduce the influence of multiple sub-waves on the experiment.

Figure 2:
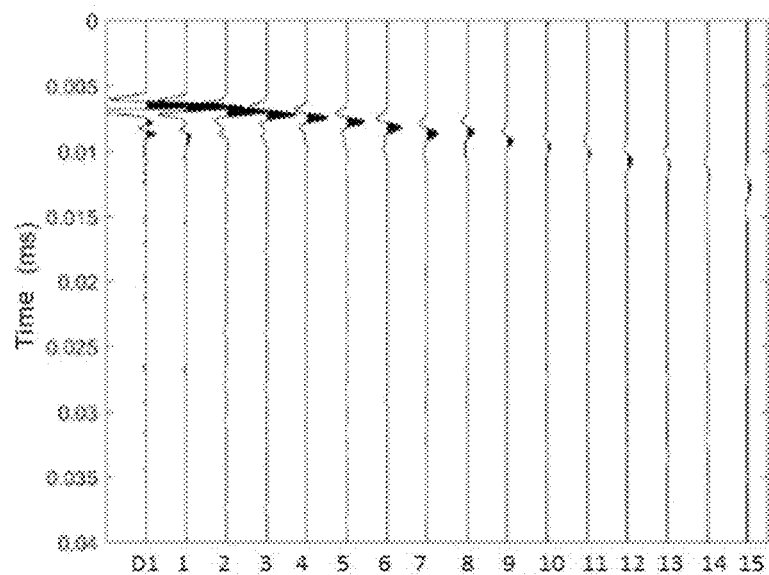
FIG. 2 is a schematic view of waveforms obtained by measuring attenuation materials prepared in Examples 1-15 and Comparative Example 1 of the present disclosure by using a pulse transmission interpolation method.
Figure 3:
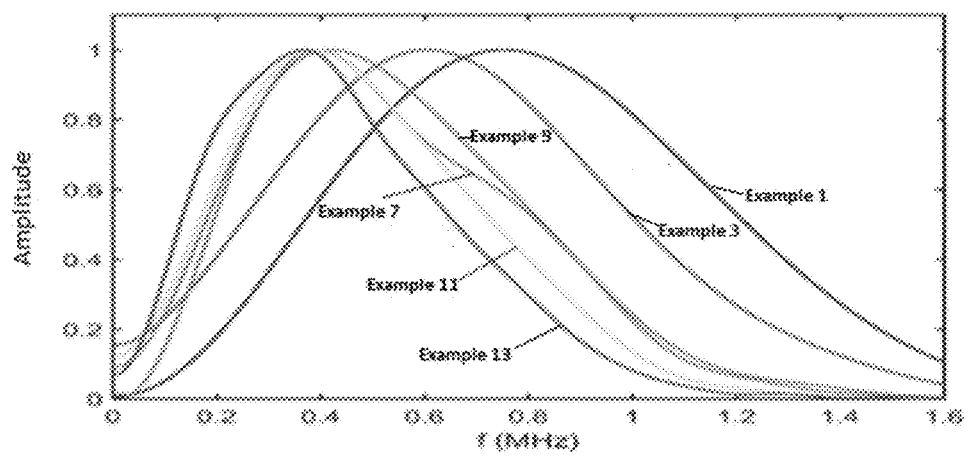
FIG. 3 shows a normalized amplitude spectrogram of signals of attenuation materials prepared in Examples 1, 3, 7, 9, 11, and 13 of the present disclosure.

The waveforms obtained by measuring the attenuation materials prepared in Examples 1-15 and Comparative Example 1 of the present disclosure with ultrasonic transducers by using a pulse transmission interpolation method are shown in FIG. 2, the FIG. 2 illustrates the attenuation parameters of the attenuation materials prepared in Examples 1-15 and Comparative Example 1, wherein Sign D1 of the horizontal ordinate is Comparative Example 1, sign 1-15 of the horizontal ordinate are Examples 1-15. Moreover, based on the data obtained by measurement in FIG. 2, the waveforms of the attenuation materials prepared in Examples 1, 3, 7, 9, 11 and 13 are subjected to spectral analysis and Fourier transformation, so as to obtain the frequency spectra as shown in FIG. 3, which illustrates a normalized amplitude spectrogram of signals of an attenuation materials prepared in Examples 1, 3, 7, 9, 11, and 13 of the present disclosure. As can be seen from FIG. 3, it can be clearly discovered from the comparison of the attenuation materials having different attenuation characteristics that the dominant frequencies of the measured signals exhibit the gradually lower tendency along with an increase of the mass ratio. In addition, the variation amplitude of the dominant frequency is more significant when the mass ratio is small, the dominant frequency of the signals of the attenuation material prepared in Example 1 is around 0.8 MHz, the dominant frequency of the signals of the attenuation material prepared in Example 3 is about 0.6 MHz, and the variation amplitude of the dominant frequency is small when the mass ratio (vulcanized silicone rubber to epoxy resin) is large, for example, the dominant frequencies of the signals of the attenuation materials prepared in Examples 7, 9, 11 and 13 are almost within a small range around 0.4 MHz, and the variation amplitude is very small.

Figure 4:
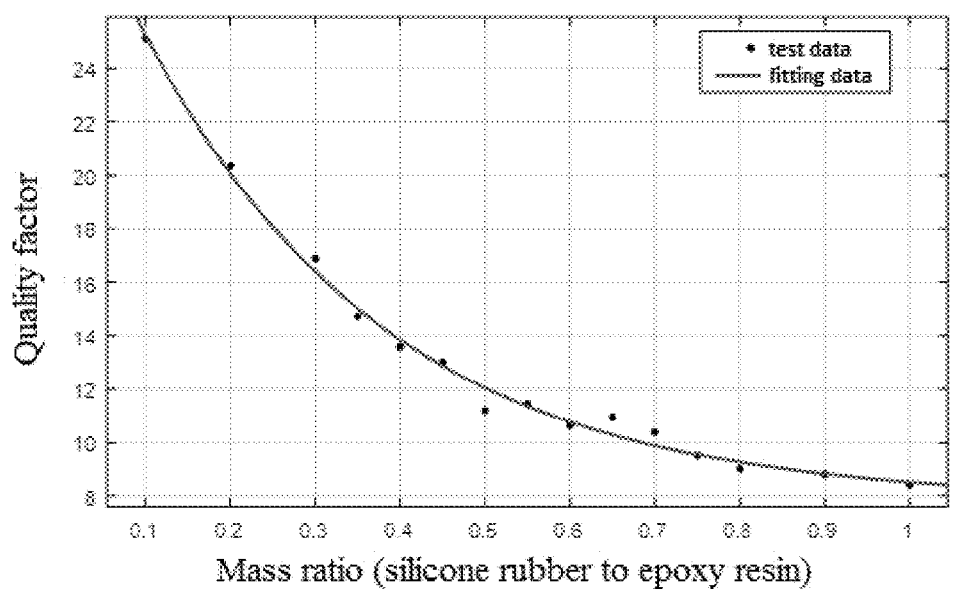
FIG. 4 is a graph illustrating a variation relationship between a weight ratio of room temperature vulcanized silicone rubber to epoxy resin and a quality factor Q value of the attenuation material prepared in Examples 1-15 of the present disclosure.

FIG. 4 illustrates the variable relationship between the velocity and the quality factor Q value of the seismic physical models prepared in Examples 1-15 and Comparative Example 1 of the present disclosure; the attenuation characteristics of the series of attenuation materials can be preliminarily judged based on the aforementioned spectral information, when the mass ratio $\Phi$ is within a range of 0.1-1, while $\Phi$ is small, the Q values of the attenuation materials have large variation amplitudes as $\Phi$ increases, and the Q values of the attenuation materials have small variation amplitudes when $\Phi$ gradually approaches 1.

Based on the measured Q data and the mass ratio of the known attenuation materials, data fitting is performed according to the mathematical relationship $Q=m*e^{n*\Phi}$, wherein the fitting data does not include the samples in Comparative Examples 1-5, as shown in FIG. 4, the mathematical relationship obtained by fitting is $Q \approx 49.9*e^{-1.95*\Phi}$, and a determination coefficient $R^2 > 0.98$. It can be discovered from a comparison between the mathematical relationship between the Q value and $V_P$ obtained by fitting and the empirical formula is $Q \approx 14*V_p^{2.2}$ (the formula is derived from the textbook A Road Towards The Precise Exploration, author QingZhong Li, [M]. Beijing: Petroleum Industry Press, 1994: 31-40), the mathematical relationship and the empirical formula have high similarity, it demonstrates that the attenuation materials prepared by the present disclosure have high similarity with the absorption attenuation law of the field stratum, and exhibit high plasticity and stability; moreover, the velocity and density of the attenuation materials can meet the requirements of physical simulation, the attenuation characteristics are close to the stratum velocity and variation law of Q value, and the simulation of low velocity layers in the near-surface stratum performed with the attenuation materials have high adaptability.

Figure 5:
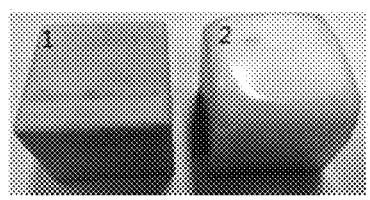
FIG. 5 shows a photograph of samples of the attenuation materials prepared in Example 7 and Comparative Example 2.

FIG. 5 shows a photograph of samples of the attenuation materials prepared in Example 7 and Comparative Example 2, wherein the left photo attached with a sign "1" is a photograph of a sample of the attenuation material prepared in Example 7, the right photo attached with a sign "2" is a photograph of a sample of the attenuation material prepared in Comparative Example 2, the photo attached with a sign "1" is a photograph of a sample prepared at a temperature of 40° C., and the photo attached with a sign "2" is a photograph of a sample prepared at a temperature of 60° C. the reason is that the oxidative solidification process is an exothermic process, the catalytic action of the mixture is significant due to the high temperature, the curing speeds of the inside and outside after injection of the mixture into a mould are significantly different, a significant bump in the middle position of the sample is visible, and the two samples have a density difference after measurement, when the two samples are put in water and fall freely, it is speculated that the density of the protruded part of the sample is small, based on the condition in which the sample are over-turned. The difference in density may seriously affect the results of subsequent experiments, thus the sample prepared at a temperature of 60° C. have poor effects.

Figure 6:
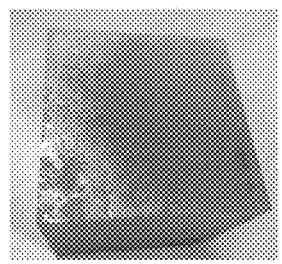
FIG. 6 illustrates a photograph of a sample of the attenuation material prepared in Comparative Example 3.

FIG. 6 illustrates a photograph of a sample of the attenuation material prepared in Comparative Example 3, given that the stirring velocity is 50 rpm and the stirring time is 4 min, a large number of minute bubbles may be present in the prepared sample of the attenuation material, and the bubbles may generate components as impurities which cause abnormal experimental data, thus the effects of the sample are not desirable.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. An attenuation material composition comprising a room temperature vulcanized silicone rubber, an epoxy resin, a first curing agent and a second curing agent, wherein the first curing agent comprises ethyl orthosilicate and dibutyltin oxide; the weight ratio of the room temperature vulcanized silicone rubber to the epoxy resin is (0.1-1):1; and the weight ratio of the ethyl orthosilicate to the dibutyltin oxide is 100:(2-4).

2. The composition of claim 1, wherein the weight ratio of the ethyl orthosilicate to the dibutyltin oxide is 100:(2.5-3.5).

3. The composition of claim 1, wherein the weight ratio of the room temperature vulcanized silicone rubber to the first curing agent is 100:(2-4).

4. The composition of claim 3, wherein the weight ratio of the room temperature vulcanized silicone rubber to the first curing agent is 100:(2.5-3.5).

5. The composition of claim 1, wherein the room temperature vulcanized silicone rubber is 10-100 parts by weight, the first curing agent is 0.3-3 parts by weight, and the second curing agent is 10-30 parts by weight, based on 100 parts by weight of the epoxy resin.

6. The composition of claim 5, wherein the room temperature vulcanized silicone rubber is 45-55 parts by weight, the first curing agent is 1-2 parts by weight, and the second curing agent is 15-25 parts by weight, based on 100 parts by weight of the epoxy resin.

7. The composition of claim 1, wherein the second curing agent is an aliphatic amine curing agent.

8. The composition of claim 7, wherein the aliphatic amine curing agent has a viscosity within a range of 50-120 mPa·s at a temperature of 25° C. and an amine value within a range of 600-700 mgKOH/g.

9. The composition of claim 1, wherein the room temperature vulcanized silicone rubber has a viscosity within a range of 2,000-12,000 mPa·s at a temperature of 25° C.

10. The composition of claim 1, wherein the epoxy resin has a viscosity within a range of 9,000-14,000 mPa·s at a temperature of 25° C. and an epoxy value within a range of 0.5-0.54 mol/100 g.

11. A method for preparing an attenuation material with the attenuation material composition of claim 1, including:
    (1) subjecting the room temperature vulcanized silicone rubber to a first heat treatment and then subjecting to a first mixing with the first curing agent to obtain a modified silicone rubber;
    (2) subjecting the epoxy resin to a second heat treatment and then subjecting to a second mixing with the second curing agent and the modified silicone rubber;
    (3) injecting the mixture obtained in step (2) into a mould and performing a curing process.

12. The method of claim 11, wherein the first heat treatment in step (1) is performed by means of constant temperature heating, and the heating is kept at a temperature of 20-50° C. for 1-48 hours.

13. The method of claim 11, wherein the conditions of the first mixing in step (1) comprise: the stirring velocity is within a range of 70-95 rpm, and the stirring time is within a range of 6-12 min.

14. The method of claim 13, wherein the stirring velocity is within a range of 80-90 rpm, and the stirring time is within a range of 8-10 min.

15. The method of claim 11, wherein the second heat treatment in step (2) is performed by means of constant temperature heating, and the heating is kept at a temperature of 20-50° C. for 1-48 hours.

16. The method of claim 11, wherein the conditions of the second mixing in step (2) comprise: the stirring velocity is within a range of 70-95 rpm, and the stirring time is within a range of 6-12 min.

17. The method of claim 11, wherein the conditions of the curing treatment in step (3) comprise: the temperature is within a range of 18-32° C., and the time is within a range of 24-96 hours.

18. An attenuation material prepared with the method of the claim 11.

19. A seismic physical model comprised of the attenuation material of claim 18.

* * * * *